United States Patent
De Pasquale et al.

(10) Patent No.: US 8,868,094 B2
(45) Date of Patent: *Oct. 21, 2014

(54) OPTIMIZING BANDWIDTH USAGE IN A CELLULAR COMMUNICATION NETWORK

(71) Applicant: Vodafone Group PLC, Newbury (GB)

(72) Inventors: Andrea De Pasquale, Madrid (ES); Francisco Javier Dominguez Romero, Madrid (ES); Brendan McWilliams, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,773

(22) Filed: Jan. 15, 2013

(65) Prior Publication Data

US 2013/0190002 A1 Jul. 25, 2013

Related U.S. Application Data

(63) Continuation of application No. 12/648,685, filed on Dec. 29, 2009, now Pat. No. 8,355,735.

(30) Foreign Application Priority Data

Dec. 29, 2008 (ES) .................................. 200803733

(51) Int. Cl.
H04W 72/04 (2009.01)
(52) U.S. Cl.
USPC ........ 455/452.1; 455/453; 455/450; 455/434; 455/553.1; 455/539; 370/332; 370/352; 370/253; 370/328; 370/330

(58) Field of Classification Search
USPC ...................... 455/450–453, 434, 553.1, 439; 370/332, 352, 253, 328, 330
See application file for complete search history.

(56) References Cited

U.S. PATENT DOCUMENTS

| | | | |
|---|---|---|---|
| 7,177,649 B1 * | 2/2007 | Nielsen .......................... | 455/453 |
| 8,289,910 B2 * | 10/2012 | Gabriel et al. ................ | 370/329 |
| 2006/0128394 A1 * | 6/2006 | Turina et al. ................... | 455/453 |
| 2007/0217390 A1 * | 9/2007 | Laroia et al. ................... | 370/350 |
| 2009/0042532 A1 * | 2/2009 | Bienas et al. .................. | 455/403 |

FOREIGN PATENT DOCUMENTS

FI WO2008081309 * 7/2008

* cited by examiner

*Primary Examiner* — Michael T Vu
(74) *Attorney, Agent, or Firm* — B. Aaron Schulman, Esq.; Nicholas Trenkle, Esq.; Stites & Harbison, PLLC

(57) ABSTRACT

A method and apparatus is provided for improving bandwidth usage in a cellular communication network serving at least one mobile terminal, the network being arranged to use a predefined bandwidth range. The apparatus includes a base band unit for capable of supporting at least a first radio access technology and a second radio access technology, a counting means for determining the number of mobile terminals within a cell of the first radio access technology supporting the second radio access technology and a measuring means for determining the level of traffic carried by the first radio access technology cell. Bandwidth assignment means are also provided so that the bandwidth assigned to GSM and LTE can be configured to take account of changes in the traffic levels and device capabilities in either RAT.

20 Claims, 3 Drawing Sheets

OPTIMIZING BANDWIDTH USAGE IN A CELLULAR COMMUNICATION NETWORK

CROSS REFERENCE TO RELATED APPLICATIONS

The present invention is a continuation of U.S. application Ser. No. 12/648,645, filed Dec. 29, 2009, said application incorporated herein by reference.

FIELD OF THE INVENTION

The invention relates to a method and system for improving bandwidth usage in a cellular communication network. In particular, the invention improves the efficiency of network resources using more than one radio access technology, giving the best technology depending on the User Equipment (UE) scenarios and traffic demand on each of the technologies.

BACKGROUND OF THE INVENTION

New Radio Access Technology, LTE (Long Term Evolution) and its successors such as 4G candidate standard LTE Advanced, are likely to be deployed in frequency bands new to cellular communications (e.g. 2.6 GHz) and old frequency bands, such as those currently used by the GSM Standard (GSM1800—1.8 GHz and GSM900—900 MHz). Whereas the latter frequencies are today solely occupied by GSM traffic, partly as a result of regulations and licensing conditions, the introduction of LTE will increase pressure for the "refarming" of those frequencies to the newer technology (and the consequent freeing up of traditionally GSM-only spectrum).

LTE is a technology that has been specified to support scalable carrier bandwidths in order to facilitate its introduction, these bandwidths include: 1.4, 3, 5, 10, 15 and 20 MHz blocks. In the sites where LTE equipment will be installed (either as two separate RRU, Remote Radio Unit, modules or as integrated Single RRU working as GSM and LTE simultaneously) the bandwidth to be dedicated to LTE can be allocated analyzing the average GSM traffic present in the area as well as the LTE-capable terminal statistical penetration.

The decision of which bandwidth to dedicate to LTE based on the above mentioned statistical parameters is not efficient since it cannot take into account the real traffic situation on a specific cell/area; in addition, any fixed bandwidth allocation to LTE in the first roll-out phase of this technology will result in a loss of GSM capacity (1.4 MHz) not compensated by the low traffic generated by the low amount of LTE terminals in the market.

SUMMARY OF THE INVENTION

In accordance with one aspect of the invention, there is provided a method for improving bandwidth usage in a cellular communication network serving at least one mobile terminal, the network being arranged to use at least a first radio access technology and a second radio access technology in a predefined bandwidth range, the method comprising, at least, the steps of:
  (i) determining the number of mobile terminals within a cell of the first radio access technology supporting the second radio access technology;
  (ii) determining the level of traffic carried by the first radio access technology cell; and
  (iii) on the basis of the number of supportive mobile terminals and the level of first radio access technology traffic, assigning a first portion of the bandwidth range to the first radio access technology and a second portion of the bandwidth range to the second radio access technology,
wherein said bandwidth range is assigned dynamically.

The proposed solution thus improves bandwidth usage in a cellular communication network using more than one radio access technology (in particular one using GSM and LTE (Long Term Evolution) technologies simultaneously) based on the automatic reconfiguration between GSM and LTE technologies in the same Base Station (BS).

In GSM systems, each terminal transmits a RAT capability signal in the GERAN (GSM Edge Radio Access Network) indicative of the terminal RAT (Radio Access Technology) capabilities. Using the RAT capability signals for each terminal, the number of mobile terminals capable of supporting LTE in each cell can be counted; the BSC is therefore able to know the number of mobile terminals connected to the GSM cell that are able to support LTE (multi-RAT terminals). The BSC also has a measure of the level of GSM traffic carried by the specific GSM cell.

This invention is applicable in the context of a single Radio Access Network (RAN). The Single RAN concept includes a base station with a single or multiple RRU (Remote Radio Unit), and single Base Band unit (BBU) capable of supporting GSM and LTE. In a preferred embodiment, the base station includes a single BBU irrespective whether a single RRU is used for all technologies or different RRUs are used for each technology. This Single BBU may be arranged to control both GSM and LTE systems. The base station makes the relevant measurements (e.g. traffic level and count of LTE-enabled terminals in cell) and subsequently takes actions based on these measurements.

Based on the measured information above (i.e. current GSM traffic and the number of LTE-capable terminals camped on the cell), a number of GSM transceivers (TRXs) will be switched-off, and an LTE carrier with the minimum bandwidth (1.4 MHz) will be activated. If the traffic on the GSM is still below a specific threshold, and if any LTE terminal has become active, a broader bandwidth could be allocated to LTE.

LTE bandwidth utilized can be further extended depending on the current GSM traffic, the number of LTE-capable terminals and/or the level of LTE traffic.

In the same way, if LTE traffic is low or LTE is being used only by non-voice traffic, and if the level of GSM traffic on the enabled transmission is above a specified threshold, the bandwidth allocated to LTE can be reduced in order to enable more transmissions to the GSM traffic.

The LTE sub-system can be switched off temporarily should an LTE minimum bandwidth threshold ever be reached and should either (a) no more LTE terminals be present in the cell; or (b) GSM traffic need more carriers while no traffic is generated by the LTE terminals camped on the cell.

In accordance with a further aspect of the invention, there is provided an apparatus for improving bandwidth usage in a cellular communication network serving at least one mobile terminal, the network being arranged to use a predefined bandwidth range, the apparatus comprising:
  a base band unit for capable of supporting at least a first radio access technology and a second radio access technology, the base band unit including a counting means for determining the number of mobile terminals within a cell of the first radio access technology supporting the second radio access technology and a measuring means for determining the level of traffic carried by the first radio access technology cell; and a bandwidth assignment means for dynamically assigning a first portion of the bandwidth range to the first radio access technology and a second portion of the bandwidth range to the second radio access technology on the basis of the number of supportive mobile terminals and the level of first radio access technology traffic.

BRIEF DESCRIPTION OF THE DRAWINGS

For a better understanding of the present invention, embodiments will now be described by way of example, with reference to the accompanying drawings, in which.

DETAILED DESCRIPTION OF THE PREFERRED EMBODIMENTS

Figure 1:
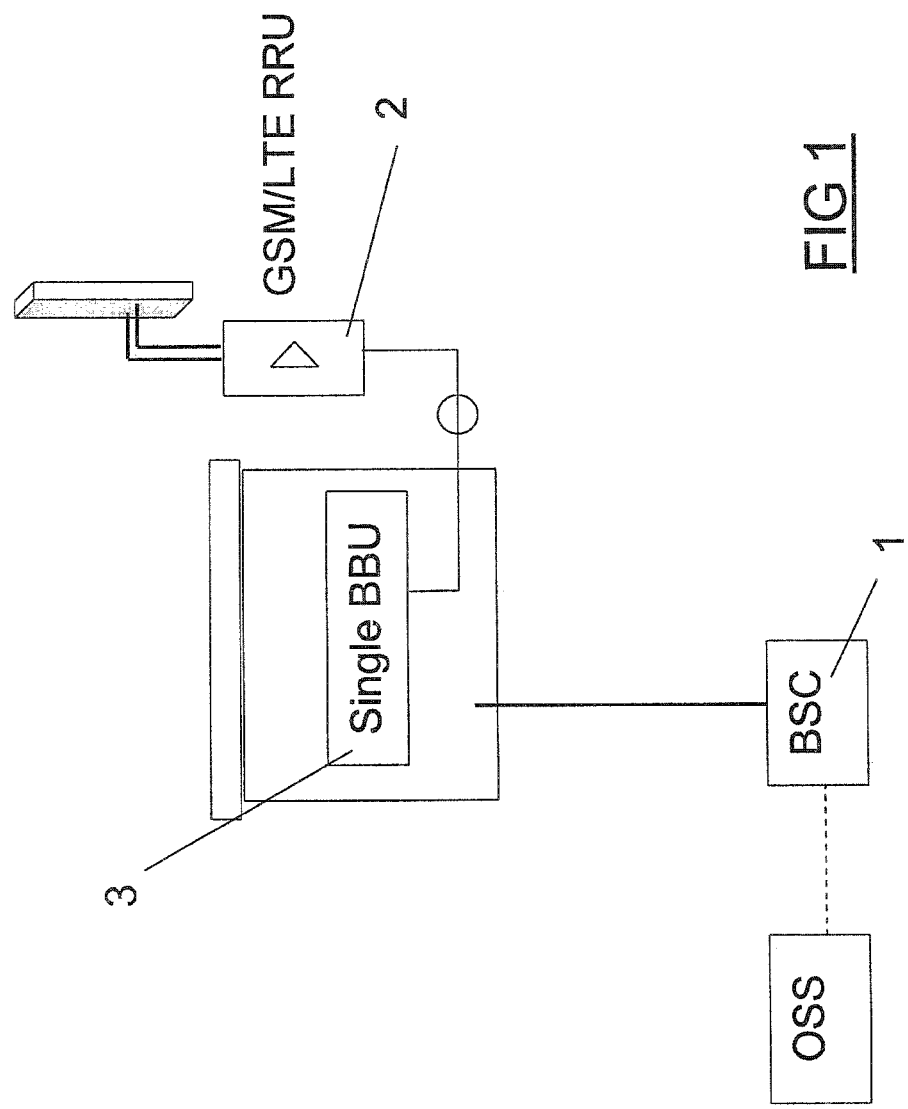
FIG. 1. shows a so-called "Single RAN" arrangement including a base station with a single or multiple RRU (Remote Radio Unit), and single Base Band unit (BBU) capable of supporting GSM and LTE.

FIG. 1 illustrates a single Radio Access Network (RAN) arrangement, including a base station 1 with a Remote Radio sub-system 2, and single Base Band unit (BBU) 3 capable of supporting both GSM and LTE RATs simultaneously. In this example a single BBU 3 is used regardless of whether the Remote Radio sub-system includes a single RRU 2 or a plurality of different RRU 2 (i.e. one for each technology). This Single BBU is arranged to control both GSM and LTE systems in accordance with the results of different measurements (e.g. traffic level and count of LTE-enabled terminals in cell).

Figure 2:
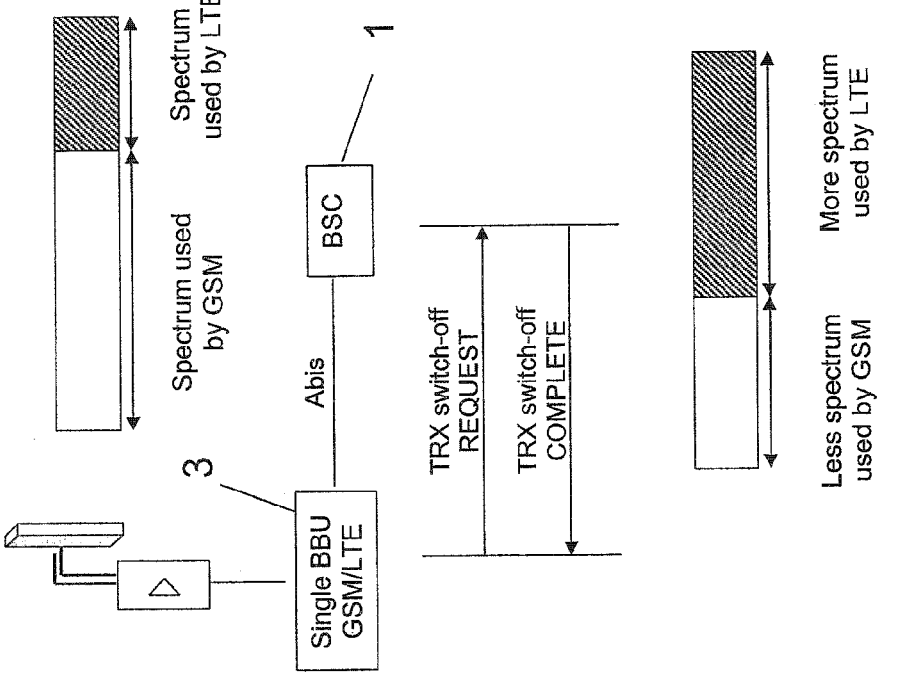
FIG. 2. illustrates an example of activation and increase of LTE bandwidth.

FIG. 2 illustrates the activation of LTE in a cell where only GSM is activated. Initially, a bandwidth of X MHz has been allocated to the operator with that bandwidth used only by GSM, [i.e. no LTE carriers are active].

Figure 3:
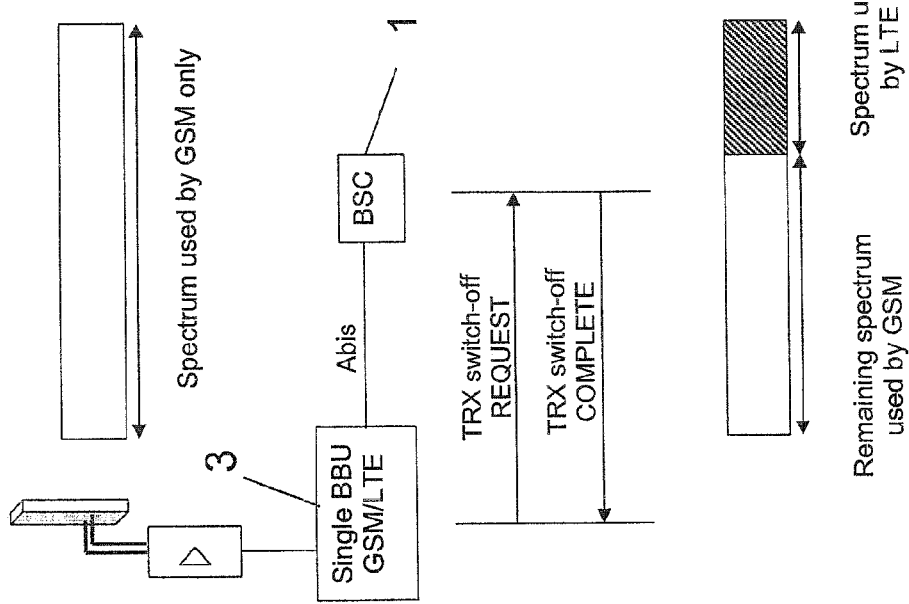
FIG. 3 also illustrates an example of activation and increase of LTE bandwidth.

FIG. 3 illustrates a similar scenario, where there is an existing LTE cell co-located (having Y MHz in bandwidth) with the GSM cell (having Z MHz in bandwidth): both LTE and GSM carriers are already activated. Here the figure illustrates the increase in bandwidth allocated to LTE (at the expense of GSM bandwidth).

As mentioned above, each terminal camping on a GSM network transmits a RAT capability signal in the GERAN (GSM Edge Radio Access Network) indicative of the terminal RAT (Radio Access Technology) capabilities. The RAT capability signals for each terminal can be arranged to indicate whether that terminal is LTE-capable.

The BSC checks the capabilities of every mobile terminal (referred to elsewhere as user equipment or simply UE) in order to determine whether there is any mobile terminal supporting LTE camped on the cell and if more than one to count those LTE-capable devices. Assuming there is at least one LTE-capable mobile terminal and the GSM traffic is not very high (i.e. there is sufficient spare bandwidth), then bandwidth (in FIG. 3, further bandwidth) can be allocated to LTE and activated. An illustrative LTE activation routine (as might be applied in FIG. 2) is described in pseudo-code:

```
If LTE UE > 0 AND GSM traffic < GSMThreshold1 then
    Switch-off a number of GSM TRXs so that 1.4 MHz of free
 spectrum are available in the Power Amplifier of the RRU
    Switch-on 1 LTE carrier of 1.4 MHz.
End if
```

The level of GSM traffic can be measured, for example, as a percentage of used timeslots in the cell versus the allocated ones (8 time slots per TRX minus those used for the signaling)). The BSC will send an "activate LTE REQUEST" message through the interface that connects the BSC to the Single BBU module (called Abis interface in the GSM specifications); the message will be implemented over the Abis interface.

The BSC, on the basis of the GSM traffic will choose to switch off a number of TRXs and will reply to the BSC via an "activate LTE COMPLETE" message, which will contain at least the following information:

Which TRXs will have to be switched off; and
The new amount of bandwidth used by LTE, specifying the start and end frequency for the LTE service.

After that, if it is necessary to increase the LTE bandwidth (in other words, it is needed to activate more spectrum to LTE—see FIG. 3), [i.e. if the LTE use in Mbps is very high and the GSM traffic level is below a threshold pre-defined by the operator] it is possible to increase the bandwidth to the next step (the bandwidth steps in LTE are: 1.4, 3, 5, 10, 15 and 20 MHz—and others if specified by 3GPP in the future). One routine to increase the bandwidth to LTE (from an existing bandwidth allocation) is next described in pseudo-code:

```
If LTE Traffic > LTEThreshold1 AND GSM traffic < GSMThreshold2
then
    Switch-off a number of GSM TRX so that:
    - Additional 1.6MHz are available for LTE if LTE was using
    1.4 MHz,
    - Additional 2 MHz are available for LTE if LTE was using
    3 MHz
    - Additional 5 MHz are available for LTE if LTE was using
    5 or 10 or 15 MHz
    Reconfigure the LTE carrier to the next step (e.g. from 1.4 to
3 MHz, from 3 to 5, from 5 to 10 MHz etc.).
End if
```

The measurements (i.e. traffic level and LTE-capable device counting) are carried out by the Single BBU module, and the decisions on which TRXs should be switched off are taken by the BSC. The Single BBU module in the example sends a message "TRX switch-off REQUEST" to the BSC over the Abis interface, the message containing at least the following Information Elements:

LTE usage in Mbps
required additional LTE bandwidth (e.g. 1.4 MHz, or 3 MHz, or 5 MHz)

The BSC will answer sending to the Single BBU module over the Abis a message "TRX switch-off COMPLETE" in which it will indicate:

which TRXs will have to be switched off.
the new amount of bandwidth used by LTE, specifying the start and end frequency for the LTE service.

Figure 4:
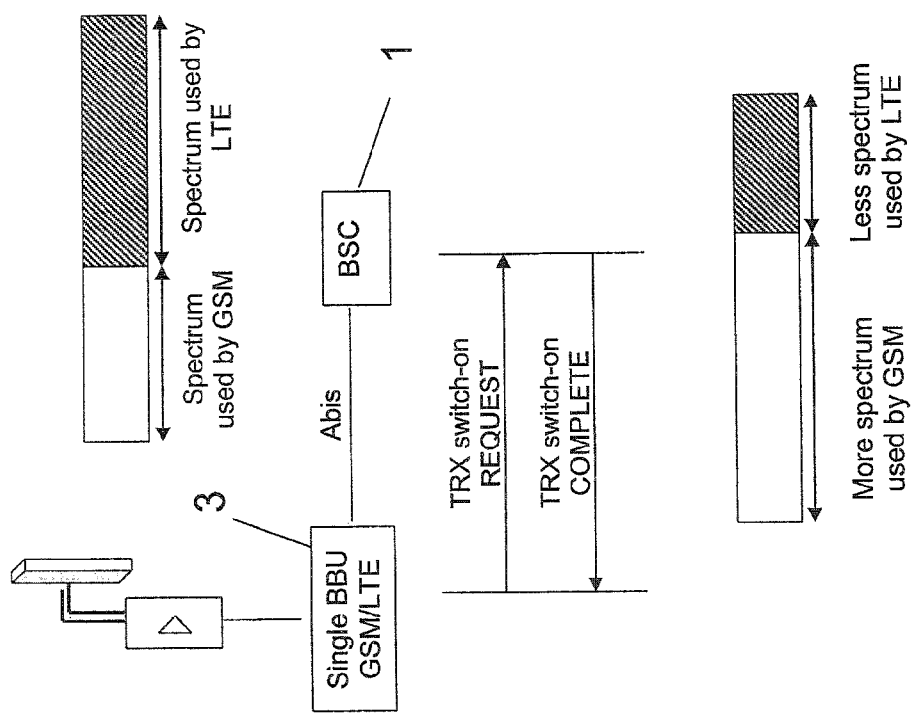
FIG. 4. illustrates an example of reduction of LTE bandwidth.

FIG. 4 illustrates an example of decrease the LTE bandwidth wherein more bandwidth for GSM is needed: the bandwidth allocated to LTE is decreased and allocated instead to GSM.

In this example, the LTE bandwidth is reconfigured to a step lower than the current one (i.e. from 20 MHz to 15 MHz, from 15 to 10, etc), and the newly available bandwidth is assigned to GSM traffic in order to activate as many TRX as possible in the GSM. Clearly, in circumstances of great changes in demand for GSM and/or LTE bandwidth the reconfiguration may encompass more than one "step down" in LTE bandwidth (i.e. from 20 MHz to 10 MHz or lower).

To be able to continue providing a minimal LTE service to those terminals that are using LTE, LTE bandwidth must be provided at a minimum level (i.e. 1.4 MHz). When the LTE bandwidth has been reduced to the minimum level, it may be necessary to treat this scenario as a special case, in which the LTE cell could be deactivated—at least temporarily. This would typically only occur when there is no LTE traffic at all. There may however be operational reasons for wishing to disable LTE altogether irrespective of the number of LTE-capable terminals.

Again the counting of LTE-capable devices and traffic level measurements are carried out by the Single BBU module, while the decisions on which TRXs will have to be switched on will be taken by the BSC.

The Single BBU module in this instance sends a message "TRX switch-on REQUEST" to the BSC over the Abis interface, the message containing at least the following Information Element:

LTE usage in Mbps

The BSC will answer sending a message "TRX switch-off COMPLETE" to the Single BBU module over the Abis interface, the message indicating:

which TRXs will have to be switched on, and over which frequency the new amount of bandwidth used by LTE, specifying the start and end frequency for the LTE service.

The reader will readily appreciate that the present invention is not limited to the improvement of bandwidth usage between 2G (GSM) RATs and 4G (LTE) RATs. The term GSM should be understood to include a first cellular radio access technology that might include GSM, GPRS, EDGE, UMTS (3G) etc.: while the term LTE should be understood to refer to a second cellular radio access technology that may have to share cells with the first cellular radio access technology, examples may include LTE, LTE Advanced, and other 4G and pre-4G RATs.

What is claimed is:

1. A method for improving bandwidth usage in a cellular communication network serving at least one mobile terminal, the network being arranged to use at least a first radio access technology and a second radio access technology, the network having a predefined bandwidth range that is usable for communications in either of the first radio access technology and the second radio access technology, the method comprising:
    determining a count of mobile terminals that are capable of communicating using both the first radio access technology and the second radio access technology and within a cell of the first radio access technology; and
    assigning segments of the predefined bandwidth range correspondingly to the first radio access technology and to the second radio access technology to improve usage of the predefined bandwidth range in the network based on the count of mobile terminals that are capable of communicating using both the first and second radio access technologies and within the cell of the first radio access technology and a level of traffic carried by the first radio access technology cell,
    wherein assignment of the segments of the predefined bandwidth range results in an increase in a first aggregate bandwidth amount of the predefined bandwidth range assigned to the first radio access technology or a decrease in the first aggregate bandwidth amount of the predefined bandwidth range assigned to the first radio access technology, and
    wherein segments of said predefined bandwidth range are assigned dynamically based on the count of mobile terminals that are capable of communicating using both the first and second radio access technologies and within the cell of the first radio access technology and a level of traffic carried by the first radio access technology cell.

2. The method according to claim 1, wherein dynamic assignment of segments of the predefined bandwidth range comprises:
    determining the level of traffic carried by the first radio access technology cell; and
    if the level of traffic carried by the first radio access technology cell is below a predetermined low traffic threshold, increasing a second aggregate bandwidth amount of the predefined bandwidth range assigned to the second radio access technology and reducing the first aggregate bandwidth amount of the predefined bandwidth range assigned to the first radio access technology.

3. The method according to claim 1, wherein dynamic assignment of segments of the predefined bandwidth range comprises:
    determining the level of traffic carried by the first radio access technology cell; and
    if the level of traffic carried by the first radio access technology cell is above a predetermined high traffic threshold, reducing a second aggregate bandwidth amount of the predefined bandwidth range assigned to the second radio access technology and increasing the first aggregate bandwidth amount of the predefined bandwidth range assigned to the first radio access technology.

4. The method according to claim 3, wherein the second aggregate bandwidth amount of the predefined bandwidth range is reduced and the first aggregate bandwidth amount of the predefined bandwidth range is increased only if a level of traffic carried by a cell of the second radio access technology is low and/or the second radio access technology is used by non-voice traffic.

5. The method according to claim 3,
    wherein the count of mobile terminals that are capable of communicating using both the first radio access technology and the second radio access technology and within the first radio access technology cell is determined based on information communicated by mobile terminals within the first radio access technology cell that indicates radio access technology capabilities of the mobile terminals that are within the first radio access technology cell, and
    wherein dynamic assignment of segments of the predefined bandwidth range further comprises:
    determining whether the second aggregate bandwidth amount of the predefined bandwidth range assigned to the second radio access technology reaches a predetermined minimum service level; and
    if no mobile terminals capable of communicating using the second radio access technology are present within in the first radio access technology cell or if the level of traffic carried by the first radio access technology cell exceeds a predetermined demand level and no traffic in the second radio access technology is generated by the mobile terminals within the first radio access technology cell, disabling the second radio access technology temporarily.

6. The method according to claim 5 wherein the second radio access technology is LTE and wherein the predetermined minimum service level is a bandwidth amount of 1.4 MHz.

7. The method according to claim 1, wherein the first radio access technology is GSM, and wherein, using information communicated by mobile terminals within the first radio access technology cell that indicates radio access technology capabilities of the mobile terminals that are within the first radio access technology cell, the count of mobile terminals that are capable of communicating using both the first and second radio access technologies and within the first radio access technology cell is determined based on transmission of RAT capabilities for each mobile terminal camping on the GSM technology network.

8. The method according to claim 1, wherein segments of the predefined bandwidth range are assigned correspondingly to the first radio access technology and to the second radio access technology dynamically further based on a level of traffic carried by a cell of the second radio access technology.

9. The method according to claim 1, wherein segments of the predefined bandwidth range are assigned correspondingly to the first radio access technology and to the second radio access technology dynamically further based on a level of traffic in the second radio access technology within an area of the cell of the first radio access technology.

10. The method according to claim 1, wherein segments of the predefined bandwidth range are assigned correspondingly to the first radio access technology and to the second radio access technology dynamically further based on a timeslot occupancy of timeslots assigned to a cell of the second radio access technology.

11. An apparatus for improving bandwidth usage in a cellular communication network serving at least one mobile terminal, the network being arranged to use a predefined bandwidth range for communications in either of a first radio access technology and a second radio access technology, the apparatus comprising:
a base band unit supporting at least the first and second radio access technologies; and
a bandwidth assignment unit for assigning segments of the predefined bandwidth range correspondingly to the first radio access technology and to the second radio access technology to improve usage of the predefined bandwidth range in the network based on a count of mobile terminals that are capable of communicating using both the first and second radio access technologies and within the cell of the first radio access technology and a level of traffic carried by the first radio access technology cell,
wherein assignment of the segments of the predefined bandwidth range by the bandwidth assignment unit results in an increase in a first aggregate bandwidth amount of the predefined bandwidth range assigned to the first radio access technology or a decrease in the first aggregate bandwidth amount of the redefined bandwidth range assigned to the first radio access technology, and
wherein the bandwidth assignment unit assigns segments of the predefined bandwidth range dynamically based on the count of mobile terminals that are capable of communicating using both the first and second radio access technologies and within the cell of the first radio access technology and a level of traffic carried by the first radio access technology cell.

12. The apparatus according to claim 11, further comprising a remote radio subsystem capable of implementing both the first radio access technology and the second radio access technology.

13. The apparatus according to claim 12, wherein the remote radio subsystem comprises first and second remote radio units, the first remote radio unit being dedicated to the first radio access technology and the second remote radio unit being dedicated to the second radio access technology.

14. The apparatus according to claim 11, wherein the base band unit includes a counting means for determining, based on information communicated by mobile terminals within the first radio access technology cell that indicates radio access technology capabilities of the mobile terminals that are within the first radio access technology cell, the count of mobile terminals that are capable of communicating using both the first and second radio access technologies and within the cell of the first radio access technology, and a measuring means for determining the level of traffic carried by the first radio access technology cell.

15. The apparatus according to claim 11, wherein the bandwidth assignment unit assigns segments of the predefined bandwidth range correspondingly to the first radio access technology and to the second radio access technology dynamically further based on a level of traffic carried by a cell of the second radio access technology.

16. The apparatus according to claim 11, wherein the bandwidth assignment unit assigns segments of the predefined bandwidth range correspondingly to the first radio access technology and to the second radio access technology dynamically further based on a level of traffic in the second radio access technology within an area of the cell of the first radio access technology.

17. The apparatus according to claim 11, wherein the bandwidth assignment unit assigns segments of the predefined bandwidth range correspondingly to the first radio access technology and to the second radio access technology dynamically further based on a timeslot occupancy of timeslots assigned to a cell of the second radio access technology.

18. A method for improving bandwidth usage in a cellular communication network serving at least one mobile terminal, the network being arranged to use at least a first radio access technology and a second radio access technology, the network having a predefined bandwidth range that is usable for communications in either of the first radio access technology and the second radio access technology, the method comprising:
determining a count of mobile terminals that are capable of communicating using both the first and second radio access technologies and within a cell of the first radio access technology; and
assigning segments of the predefined bandwidth range correspondingly to the first radio access technology and to the second radio access technology dynamically to improve usage of the predefined bandwidth range in the network based on:
the count of mobile terminals that are capable of communicating using both the first and second radio access technologies and within the cell of the first radio access technology, and
a level of traffic carried by the first radio access technology cell,
wherein assignment of the segments of the redefined bandwidth a results in an increase in a first aggregate bandwidth amount of the predefined bandwidth range assigned to the first radio access technology or a decrease in the first aggregate bandwidth amount of the predefined bandwidth range assigned to the first radio access technology.

19. The method according to claim 18, further comprising determining the level of traffic carried by the first radio access technology cell, and wherein the count of mobile terminals that are capable of communicating using both the first and second radio access technologies and within the cell of the first radio access technology is determined based on information communicated by mobile terminals within the first radio access technology cell that indicates radio access technology capabilities of the mobile terminals that are within the first radio access technology cell.

20. A method for improving bandwidth usage in a cellular communication network serving at least one mobile terminal, the network being arranged to use at least a first radio access technology and a second radio access technology, the network having a predefined bandwidth range that is usable for communications in either of the first radio access technology and the second radio access technology, the method comprising:

determining a count of mobile terminals that are capable of communicating using both the first and second radio access technologies and within a cell of the first radio access technology; and assigning segments of the predefined bandwidth range correspondingly to the first radio access technology and to the second radio access technology to improve usage of the predefined bandwidth range in the network based on the count of mobile terminals that are capable of communicating using both the first and second radio access technologies and within the cell of the first radio access technology wherein assignment of the segments of the predefined bandwidth range results in an increase in a first aggregate bandwidth amount of the predefined bandwidth range assigned to the first radio access technology or a decrease in the first aggregate bandwidth amount of the predefined bandwidth range assigned to the first radio access technology, and wherein segments of said predefined bandwidth range are assigned dynamically based on the count of mobile terminals that are capable of communicating using both the first and second radio access technologies and within the cell of the first radio access technology.

* * * * *